United States Patent [19]

Wang

[11] Patent Number: 5,095,088
[45] Date of Patent: Mar. 10, 1992

[54] CYCLIC POLYCARBONATE OLIGOMER CONTAINING SPIRO DILACTAM MOIETIES

[75] Inventor: Pen-Chung Wang, Houston, Tex.

[73] Assignee: Shell Oil Company, Houston, Tex.

[21] Appl. No.: 566,195

[22] Filed: Aug. 13, 1990

[51] Int. Cl.$^5$ .............................................. C08G 64/12
[52] U.S. Cl. .................................. 528/203; 528/196; 528/201; 528/204; 528/323
[58] Field of Search ............... 528/203, 323, 204, 201, 528/196

[56] References Cited

U.S. PATENT DOCUMENTS

| | | | |
|---|---|---|---|
| 4,197,394 | 4/1980 | Hallgren | 528/190 |
| 4,605,731 | 8/1986 | Evans et al. | 528/371 |
| 4,644,053 | 2/1987 | Brunelle et al. | 528/371 |
| 4,740,583 | 4/1988 | Brunelle et al. | 528/370 |
| 4,746,726 | 5/1988 | Evans et al. | 528/371 |
| 4,906,725 | 3/1990 | Wang | 528/203 |

OTHER PUBLICATIONS

Schnell, *Industrial and Engineering Chemistry*, 51, (2), pp. 157–160 (1959).

*Primary Examiner*—Harold D. Anderson

[57] ABSTRACT

Novel cyclic polycarbonate oligomers of relatively high glass transition temperatures consist essentially of carbonyl moieties alternating in a cyclic chain with moieties of a 1,6-diaza [4.4] spirodilactam having an oxyaryl-containing substituent on each ring nitrogen atom and, optionally, moieties of a di(oxyphenyl) compound.

29 Claims, No Drawings

CYCLIC POLYCARBONATE OLIGOMER CONTAINING SPIRO DILACTAM MOIETIES

FIELD OF THE INVENTION

This invention relates to certain novel cyclic polycarbonate oligomers. More particularly, the invention relates to novel cyclic oligomers which incorporate carbonyl moieties alternating in a cyclic chain with moieties of a 1,6-diazaspiro[4.4]nonane-2,7-dione having oxyaryl-containing substituents on the spiro ring nitrogen atoms, and optionally, moieties of a di(oxyphenyl) compound.

BACKGROUND OF THE INVENTION

The class of polycarbonate polymers is broadly known in the art. An early review article by Schnell, *Industrial and Engineering Chemistry*, Vol. 51, No. 2, pp. 157–160 (1959), describes properties of the class of polycarbonates and methods known in the art at that time for the preparation of polycarbonate polymers including certain polycarbonate polymers which are now commercial. In general, the polycarbonate polymers are thermoplastics whose glass transition temperatures will depend upon the nature and symmetry of the groups incorporated into the polycarbonate chain other than the carbonyldioxy groups. Most polycarbonates are derived from a bisphenol and commercial polycarbonates are frequently derived from 2,2-di(4-hydroxyphenyl)propane, also known as bisphenol A or BPA. The polycarbonate polymers are conventionally produced by reaction of a bisphenol or an alkali metal salt thereof with phosgene or by ester exchange with a diaryl carbonate, particularly diphenyl carbonate.

These polymers are processed by conventional methods employed for thermoplastics such as injection molding or extrusion into films, sheets, fibers, tubing and shaped articles. The articles produced from polycarbonate polymers demonstrate good resistance to oxygen, heat and light as well as to common solvents.

The preparation of cyclic polycarbonates and their conversion to linear polycarbonates is known, for example, in U.S. Pat. Nos. 4,605,731, 4,644,053, 4,727,134 and 4,740,583. It would be of advantage to provide a novel class of cyclic polycarbonate oligomers containing multiple rings, which can be used to prepare linear polycarbonate polymer products.

SUMMARY OF THE INVENTION

This invention provides a class of novel cyclic polycarbonate oligomers. More particularly, the invention provides novel cyclic polycarbonate oligomers characterized by carbonyl moieties alternating in a cyclic chain with moieties of a 1,6-diaza [4.4] spirodilactam having a oxyaryl-containing substituent on each spiro ring nitrogen atom, and optionally, moieties of a di(oxyphenyl) compound, said cyclic oligomers having a degree of polymerization of from about 2 to about 20.

DESCRIPTION OF THE INVENTION

The novel cyclic polycarbonate oligomers of the invention are produced by reaction of a carbonate source material, such as phosgene or a diaryl carbonate ester, with a dihydroxyaryl-containing spirodilactam and, optionally, a di(hydroxyphenyl) compound.

The preferred spirodilactam reactant is a 1,6-diazaspiro[4.4]-nonane-2,7-dione reactant of up to 60 carbon atoms inclusive which is substituted on each spiro ring nitrogen atom with a hydroxyaryl-containing substituent. One class of such spirodilactams is represented by the formula

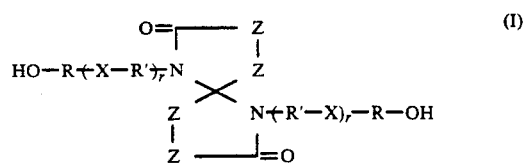

wherein Z independently is $>C(Z')_2$ in which $Z'$ independently is hydrogen, lower alkyl of up to 4 carbon atoms, inclusive, preferably methyl, halogen, preferably the lower halogens fluoro and chloro or aryl of up to 10 carbon atoms, preferably phenyl, or Z is such that two adjacent Z groups form a ring system $Z''$ of 1 to 3 rings, each ring of from 5 to 7 ring atoms, inclusive, up to two of which are heteroatoms selected from nitrogen, oxygen or sulfur with the remainder of the ring atoms being carbon atoms, there being up to 15 carbon atoms in each $Z''$, two of which form a bridge between the carbon atoms connected by the two adjacent Z groups. In the above formula I, R independently is aromatic of up to 15 carbon atoms and from 1 to 2 aromatic rings, inclusive, $R'$ independently is R or aliphatic of up to 10 carbon atoms, inclusive, r independently is 0 or 1 and X independently is a direct valence bond, or X is alkylene of up to 8 carbon atoms, inclusive, oxy, thio, sulfonyl, carbonyl, dioxyphenylene, i.e., dioxybenzene, 2,2-di(oxyphenyl)propane, di(oxyphenyl) sulfone and dioxydiphenylene, i.e., dioxybiphenyl. The R, $R'$ and X groups are otherwise hydrocarbyl containing only atoms of carbon and hydrogen besides any additional atoms present as divalent linking groups or are substituted hydrocarbyl additionally containing other atoms present as monovalent carbon atom substituents such as halogen, preferably the middle halogens, chloro and bromo.

Spirodilactams of a considerable variety of structures are therefore suitably employed as a precursor of the polycarbonate polymers of the invention. In the embodiment of the invention wherein the Z moieties of the spirodilactam are acyclic, i.e., Z is $>C(Z')_2$, the spirodilactam is illustrated by 1,6-di(4-hydroxyphenyl)-1,6-diazaspiro[4.4]nonane-2,7-dione, 1,6-di(4-hydroxyphenyl)3,4,8,9-tetrafluoro-1,6-diazaspiro[4.4]nonane-2,7-dione, 1,6-di(3-hydroxy-4-chlorophenyl)-3,8-dimethyl-1,6-diazaspiro[4.4]nonane-2,7-dione, 1,6-di(4-hydroxyphenyl)-3,3,4,4,8,8,9,9-octamethyl-1,6-diazaspiro[4.4]nonane-2,7-dione, 1,6-di[4-(4'-hydroxybiphenyl)]-3,3-diphenyl-1,6-diazaspiro[4.4]nonane-2,7-dione, 1,6-di[2-(4-hydroxyphenyloxy)propyl]-1,6-diazaspiro[4.4]nonane-2,7-dione and 1,6-di[4-(4-hydroxyphenylisopropyl)phenyl]-1,6-diazaspiro[4.4]nonane-2,7-dione. In the embodiment wherein adjacent Z groups of the above formula I form a cyclic structure fused to each of the spiro rings, i.e., adjacent Z groups are $Z''$, illustrative spirodilactams include 1,6-di(4-hydroxyphenyl)-3,4,8,9-dibenzo-1,6-diazaspiro[4.4]nonane-2,7-dione, and 1,6-di[4-(4-hydroxyphenylthio)phenyl]-3,4,8,9-di(pyrido)-1,6-diazaspiro[4.4]nonane-2,7-dione. Also suitable are the spirodilactams wherein one spiro ring has a fused ring substituent and the other spiro ring is free of fused ring substituents, e.g., 1,6-di(4-hydroxyphenyl)-3,4-benzo-8-methyl-1,6-diazaspiro[4.4-

]nonane-2,7-dione and 1,6-di[1-(4-hydroxynaphthyl)]-3,4-(cyclopentano)-1,6-diazaspiro[4.4]nonane-2,7-dione.

In general, the spirodilactams of the above formula I wherein each R and R' is aromatic and hydrocarbyl are preferred, particularly those compounds wherein each r is 0. The 1,6-di(hydroxyphenyl) spirodilactams are particularly preferred, especially the 1,6-di(4-hydroxyphenyl) spirodilactams. Within the spirodilactam portion of the molecule, those spirodilactams where the spiro rings are free from fused cyclic substituents are preferred as are the spirodilactams wherein each spiro ring has a fused cyclic substituent. The 1,6-diazaspiro[4.4]nonane-2,7-diones are the preferred members of the former class whereas 3,4,8,9-dibenzo-1,6-diazaspiro[4.4]nonane-2,7-diones are preferred among the latter class.

The hydroxyaryl-substituted spirodilactams of the above formula I are described in greater detail and are claimed in copending allowed U.S. patent application Ser. No. 245,618, filed Sept. 16, 1988, now U.S. Pat. No. 4,939,251. The general method of producing such spirodilactams is also disclosed and claimed in that copending U.S. patent application and in copending U.S. patent application Ser. No. 524,412, filed May 16, 1990, the disclosures of each of which are incorporated herein by reference. The process comprises the reaction of a hydroxyaryl-containing primary amino compound and a spirodilactam precursor.

In terms of the spirodilactam of formula I, the hydroxyaryl-containing primary amino compound is represented by the formula

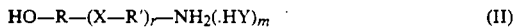

wherein R, R', X and r have the previously stated meanings; m is 0 or 1; and HY is an acid which forms a salt with the amine, including both inorganic and organic acids which do not interfere with the reaction, such as hydrohalogenic acids, for example, hydrochloric and hydrobomic, sulfur acids, for example surfuric or sulfonic, phosphorus acids, for example phosphoric or phosphonic, and carboxylic acids, for example oxalic and the like. Preferably, Y is halogen, e.g., fluorine, chlorine, bromine or iodine and especially chlorine or bromine.

The spirodilactam precursor is a 4-oxoheptanedioic acid compound or a 1,6-dioxaspiro[4.4]nonane-2,7-dione.

In terms of the spirodilactam of formula I, the 4-oxoheptanedioic acid compound precursor of the spirodilactam is represented by the formula

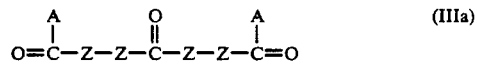

wherein A independently is hydroxy, lower alkoxy of up to 4 carbon atoms, inclusive, or halo, preferably the middle halogens chloro and bromo, and Z has the previously stated meaning. The spirodilactone precursor of the spirodilactam of formula I is represented by the formula

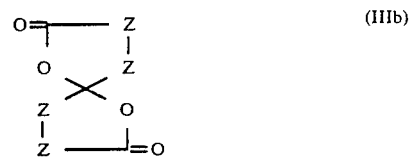

wherein Z has the previously stated meaning.

The acyclic 4-oxoheptanedioic acid compounds are known or are produced by known methods, but certain of the esters are also produced by the reaction of formaldehyde and an ethylenically unsaturated carboxylic acid ester, e.g., methyl acrylate or ethyl methacrylate, in the presence of a catalyst system comprising a thiazolium salt and a tertiary amine, by the process disclosed and claimed in U.S. Pat. No. 4,800,231. Interconversion of the free acids, esters or acid halides of formula IIIa is by conventional methods. The production of 4-oxoheptanedioic acid compounds which contain cyclic moieties is by the process of Cava et al, *J. Am. Chem. Soc.*, 77, 6022 (1955). The spirodilactones of formula IIIb are produced by the method of Pariza et al, *Synthetic Communications*, Vol. 13(3), pp. 243–254 (1983), or by the process of U.S. Pat. No. 1,999,181.

Reaction of the hydroxyaryl-containing primary amino compound and the spirodilactam precursor takes place in a liquid phase reaction environment in an inert reaction diluent such as an N-alkylamide such as N,N-dimethylformamide or N,N-dimethylacetamide. The reactants are provided in a molar ratio of about 2:1 and reaction occurs at an elevated reaction temperature, e.g., from about 80° C. to about 250° C. and a reaction pressure sufficient to maintain the reaction mixture in a liquid phase. Subsequent to reaction the hydroxyaryl-containing spirodilactam product is recovered from the product mixture by conventional methods such as solvent removal, precipitation or chromatographic techniques.

The optional reactant in the process of the invention is a di(hydroxyphenyl) compound of up to 25 carbon atoms. A considerable variety of such di(hydroxyphenyl) compounds are useful as optional components of the polycarbonate polymers of the invention. Illustrative of such compounds include dihydroxybenzenes such as hydroquinone and resorcinol, dihydroxynaphthalenes such as 2,7-dihydroxynaphthalene, and 5-dihydroxynaphthalene. The preferred optional components represented by the formula

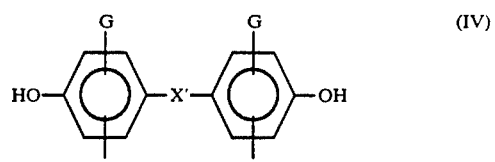

wherein X' is a direct valance bond or X' is alkylene of up to 8 carbon atoms, inclusive, oxy, thio, sulfonyl or carbonyl and G independently is hydrogen, alkyl, preferably lower alkyl of up to 4 carbon atoms, or halo, preferably the middle halogens chloro or bromo. Illustrative of the di(hydroxyphenyl) compound of formula III are 2,2-di(4-hydroxyphenyl)propane, 2,2-di(4-hydroxy-3-methyl-phenyl)propane, 2,2-di(4-hydroxy-3-chlorophenyl)propane, 2,2-di(4-hydroxy-3,5-dibromophenyl)propane, 2-(4-hydroxyphenyl)-2-(4-hydroxy-3- chloro-5-methyl-phenyl)propane, 2-(4-hydroxyphenyl)-2-(4-hydroxyphenyl)-2-(4-hydroxy-3,5-di-bromophenyl)propane, di(4-hydroxy-3-chlorophenyl)sulfone (4-hydroxyphenyl), (4-hydroxy-3,5-dibromo-phenyl)ether, 4,4'-dihydroxy-biphenyl, di(4-hydroxyphenyl)ketone and di(4-hydroxy-3-methylphenyl)sulfide or position isomers thereof. The compounds of the above formula IV wherein each G is hydrogen or halo, and X' is 2,2-propylene, are preferred and the compound 2,2-di(4-hydroxy-phenyl)propane, also referred to as bisphenol A or BPA, is a preferred member of the class of di(hydroxyphenyl) compounds. These compounds are known or are produced by known methods.

The hydroxyaryl-substituted spirodilactam and, if present, the di(hydroxyphenyl) compound, are converted to the cyclic polycarbonate oligomer by reaction of the spirodilactam and dihydroxyphenyl compound, if present, or metal salt thereof with a carbonate source. Although other metal salts are usefully employed in the modification where the salts of the hydroxy-containing reaction components are formed, in the preferred modification the spirodilactam and di(hydroxyphenyl) compound, if present, are converted to the alkali metal salt, preferably the sodium salt or the potassium salt, by neutralization with an alkali metal hydroxide, carbonate or bicarbonate while any water present or formed is removed by distillation or by selective extraction. The resulting alkali metal salt or salts are recovered, if desired, by conventional methods but are also suitably reacted in situ to produce the cyclic polycarbonate oligomer.

In the one embodiment where no optional oligomer component is to be present, i.e., the cyclic polycarbonate oligomer is a co-oligomer, no salt of the di(hydroxyphenyl) compound is formed, of course. In the modification where the desired cyclic polycarbonate oligomer is a teroligomer, the salt of the di(hydroxyphenyl) is formed and is present in the reaction mixture. It is useful in such a modification to neutralize a mixture of the hydroxyaryl-substituted spirodilactam and the di(hydroxyphenyl) compound and thereby form a mixture of salts. Alternatively, however, the salt of the hydroxyaryl-substituted spirodilactam and the salt of the di(hydroxyphenyl) are produced separately and subsequently mixed.

The presence of the alkali metal salt in the reaction mixture of the di(hydroxypehnyl) compound is optional and is not required, but when present the alkali metal salt of the di(hydroxyphenyl) compound is optional and is not required, but when present the alkali metal salt of the di(hydroxyphenyl) compound is present in a molar quantity up to twice the molar quantity of the alkali metal salt of the spirodilactam reactant. Preferably, the alkali metal salt of the di(hydroxyphenyl) compound is present in a molar quantity up to equal that of the alkali metal salt of the hydroxyaryl-substituted spirodilactam.

The alkali metal salt, whether recovered or utilized in situ, is reacted in one modification with phosgene present in a slight molar excess over the total molar quantity of the other reactants. The reaction is conducted in an inert non-polar organic reaction solvent, and under substantially ambient conditions of temperature and pressure. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Chloroform is generally preferred. The cyclic oligomer product thereby produced is recovered from the reactant solution and any polymer byproduct by conventional techniques such as filtration, solvent removal or precipitation with a nonsolvent for the oligomer.

In a second embodiment of the process for the production of the cyclic polycarbonate oligomer, often preferred in part because of reasons of each of handling the reactants, the cyclic polycarbonate oligomer is produced by contacting the hydroxyaryl-substituted spirodilactam and di(hydroxyphenyl) compound, if present, without conversion to a salt, with an amount of a diaryl carbonate ester, particularly diphenyl carbonate, present in an amount preferably of low concentration, generally up to about 0.5M. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformates, and optionally other reagents, are added gradually to a reaction vessel containing the organic liquid.

Although addition of bischloroformates neat (i.e., without solvents) is within the scope of this embodiment, it is frequently inconvenient because many bischloroformates are solids. Therefore, they are preferably added as a solution in a portion of the organic liquid. The proportion of organic liquid used for this purpose is not critical: about 25-75% (by weight) of the total, and especially about 40-60%, is preferred. Such contacting is with the total of the other reactants. Such contacting is conducted in the absence of oxygen and preferably in an inert atmosphere. As the temperature of the resulting mixture is raised and the pressure is lowered, the components of the reaction mixture tend to undergo ester exchange and a hydroxyaryl compound, e.g., phenol, is driven from the reaction mixture as by distillation to produce the polycarbonate polymer. Temperatures from about 100° C. to about 300° C. are suitable for the ester exchange with preferred temperatures being from about 150° C. to about 250° C. The process is facilitated by reduced pressure, as by application of a vacuum.

The production of the cyclic polycarbonate oligomer, e.g., the teroligomer, is also easily accomplished by the conversion of one of the bisphenol precursors to a metal salt and the other bisphenol precursor to the di(chloroformate). Although other metal salts are useful in the production of the cyclic polycarbonate oligomer, the preferred metal salts are alkali metal salts and particularly preferred are sodium salts or potassium salts. To produce the alkali metal salt, one bisphenol, e.g., either the hydroxyaryl-substituted spirodilactam or the di(hydroxyphenyl) compound, is reacted with an alkali metal source, such as the alkali metal hydroxide, carbonate, bicarbonate or amide. In another embodiment, the production of the alkali metal salt is conducted by contacting the bisphenol and the alkali metal source and removing by-products as by distillation. In another embodiment, an aqueous solution of alkali metal source is vigorously agitated with the bisphenol to form the alkali metal salt. The di(chloroformate) of the other bisphenol is produced by the conventional phosgene method as described, for example, in U.S. Pat. Nos. 4,594,404, 4,601,858 and 4,638,077. The bisphenol derivatives are contacted in an inert reaction diluent or diluent mixture at moderate temperature. In one modification the bisphenol derivatives are contacted in a miscible solvent and the reaction is homogeneous. In an alternate modification, the bisphenol derivatives are provided in immiscible diluents and the reaction, necessarily heterogeneous, is conducted with vigorous stirring, shaking or other agitation to provide reactant contact. The bisphenol derivatives are provided in any convenient ratio and molar ratios of the alkali metal derivative to the chloroformate derivative from about 5:1 to about 1:5 are satisfactory. The oligomerization takes place in a 1:1 ratio of reactants and provision of the alkali metal derivative and the chloroformate derivative in a molar ratio that is substantially stoichiometric is preferred.

For maximization of the yield and purity of cyclic oligomers as opposed to high polymer and insoluble and/or intractable by-products, it is preferred to use not more than about 1.5 mole of bischloroformates per liter of organic liquid in the reaction system, including any liquid used to dissolve said bischloroformates. Preferably, about 0.003-1.0 mole of total bischloroformates is present per liter of organic liquid. It should be noted that this is not a molar concentration in said liquid when the bischloroformates are added gradually, since they are consumed as added to the reaction system.

The molar proportions of the reagents constitute another important feature for yield and purity maximization. The preferred molar ratio of amine to bischloroformates is usually about 0.06-2.0:1 and preferably about 0.1-0.25:1. That of base to bischloroformates is at least about 2.0:1 and preferably about 2.5-3.1:1. In general, lower proportions of base (typically a molar ratio of about 2.4-2.75:1) are employed with a crude bischloroformate composition than with substantially pure monomer bischloroformates (about 2.75-3.1:1).

A factor of some importance is the concentration of available amine, which should be maintained at a level as constant as possible during the entire bischloroformate addition period. If all amine is present in the reaction vessel into which bischloroformates are introduced, its concentration steadily decreases, principally by dilution. On the other hand, if amine is introduced continuously or in equal increments during bischloroformate introduction, its available concentration is initially low and increases more or less steadily during the addition period. These fluctuations can result in an undesirably high and constantly varying proportion of high polymers in the product.

The reaction takes place under oligomerization conditions in a liquid phase and a small amount of a tertiary amine or quaternary ammonium salt is usually added as a catalyst. The tertiary amines useful in the method of the invention ("tertiary" in this context denoting the absence of N-H bonds) generally comprise those which are oleophilic (i.e., which are soluble in and highly active in organic media, especially those used in the oligomer preparation method), and more particularly those which are useful for the formation of polycarbonates. Reference is made, for example, to the tertiary amines disclosed in U.S. Pat. Nos. 4,217,438 and 4,368,315, the disclosures of which are also incorporated by reference herein. They include aliphatic amines such as triethylamine, tri-n-propylamine, diethyln-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the bischloroformates is essential for the formation of the cyclic oligomer mixture. For the most part, such amines contain at least about 6 and preferably about 6-14 carbon atoms.

Useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers. Trialkylamines such as trimethylamine, triethylamine, dimethylbutylamine and trihexylamine are suitable for this purpose. The phase transfer catalyst can be quaternary ammonium compound such as those of formula V

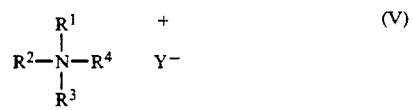

wherein $R^1$, $R^2$, $R^3$ and $R^4$ each independently is an alkyl group of 1 to 20 carbon atoms, an aralykyl or alkaryl group of 7 to 9 carbon atoms or an aryl group of 6 to 12 carbon atoms and Y is a monovalent ion.

In the formula V above, Y can be hydroxide, halide, (alkyl)sulfate, (alkyl)sulfonate, (aryl)sulfonate, tetrafluoroborate, phosphate, nitrate or alkyl- or arylcarboxy and the like. When these catalysts are available in a neutralized form, for instance in the chloride form, they must be activated to the hydroxyl form by treatment with an aqueous alkali metal hydroxide, for example, sodium hydroxide, and washed with water to remove salt anions before use.

More particularly, one preferred subclass of catalysts of the above formula V are those in which $R^1$, $R^2$, $R^3$ and $R^4$ each independently is an alkyl group of 1 to about 8 carbon atoms such as methyl-trioctylammonium chloride, tributylammonium bromide, tetra-n-butylammonium hydroxide, bromide or chloride, methyl-tri-2-methyl-heptylammonium chloride, tetramethylammonium bromide, tetrabutylphosphonium bromide or tetraethylammonium bromide. Other suitable catalysts of this type are known under the trade names "Hyamine 1622," "Hyamine 2389," "Hyamine 3500," "Aliquat 336" and "Adogen 464" (all five trade names are registered trademarks). Another preferred subclass of catalysts of formula V are those containing one or more phenyl or benzyl groups as $R^1$, $R^2$, $R^3$ and $R^4$, such as triethylbenzylammonium chloride or ethyltriphenylammonium bromide or the like.

Typical oligomerization conditions include a temperature of 0° to about 50° C. and preferably about 20° C. to about 40° C. and a pressure that will maintain the reaction mixture in a liquid phase. Pressures from about 0.8 atmosphere to about 5 atmospheres are suitable. The cyclic polycarbonate oligomer is recovered by conventional techniques. The cyclic oligomer (mixtures) of this invention contain very low proportions of linear oligomers, if any. In general, no more than about 5% by weight of such linear oligomers are present. The mixtures also usually contain low percentages (frequently less than 10% and preferably no higher than about 5%) of polymers (linear or cyclic) having a degree of polymerization greater than about 30. Such polymers are frequently identified hereinafter as "high polymer." These properties, coupled with the relatively low melting points and viscosities of the cyclic oligomer mixtures, contribute to their utility as polycarbonate precursors, especially for solvent-resistant high molecular weight polycarbonates, as described hereinafter.

The resulting cyclic polycarbonate oligomer is a cyclic oligomer of linear units consisting essentially of moieties of carbonyl alternating in a cyclic chain with moieties of a 1,6-diaza [4.4] spirodilactam having oxyaryl-containing substituents on the spiro ring nitrogen atoms through which the spirodilactam moieties are connected to the carbonyl moieties and optionally moieties of di(oxyphenyl) compound. Linear refers to the moieties forming a cyclic oligomer chain that are essentially non-branched. One class of such cyclic polycarbonate oligomers, in terms of the spirodilactams of formula I, are oligomers, substantially free of polymers, represented by the repeating first segment formula VI

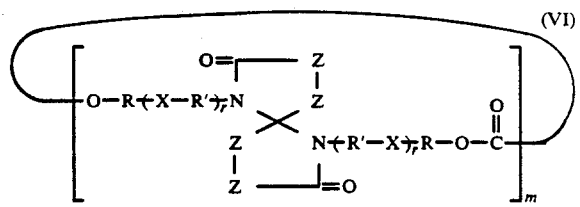

and teroligomers additionally containing in the cyclic chain a repeating second segment of formula VII

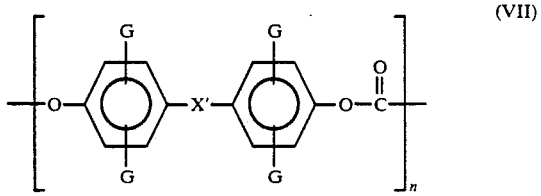

wherein R, R', r, X, X', Z and G have the previously stated meanings and m is from about 1 to about 20, but at least 2 when n is 0. Within the co-oligomers of the invention, only segments of the first type, i.e., segments of formula VI, are present in the cyclic polycarbonate oligomer chain. Within the terpolymers of the invention, formed when the di(hydroxyphenyl)alkane or a salt thereof is present in the reaction mixture, first repeating segments (formula VI) and second repeating segments (formula VII) wherein X' and G have the previously stated meaning and n is from about 0 to about 19 and the sum of m+n equal from about 2 to about 20, are found randomly throughout the cyclic polycarbonate oligomer chain, preferably m+n equal from about 3 to about 5. The cyclic oligomers of the invention usually have varying degrees of m+n, as opposed to a single uniform unit value.

Although the nomenclature of such oligomers is not easily determined because of the complexity thereof, the identity of the cyclic polycarbonate oligomers will be apparent from consideration of the structures of the hydroxy-containing reactants (formula I and IV) as depicted above. By way of specific illustration, however, is the cyclic co-oligomers having alternating carbonyl moieties and moieties of 1,6-di(oxyphenyl)-1,6-diazaspiro[4.4]nonane-2,7-dione and the cyclic co-oligomers of alternating carbonyl moieties and moieties of 1,6-di(4-oxy-3-bromophenyl)-3,4,8,9-dibenzo-1,6-diazaspiro[4.4]nonane-2,7-dione. Corresponding cyclic teroligomers additionally having moieties of 2,2-di-(4-oxyphenyl)propane result when 2,2-di(4-hydroxyphenyl)propane or a salt thereof is present in the reaction mixture. Of particular interest are the cyclic polycarbonate oligomers of the formulas VI or VII having a molecular weight from about 500 to about 20,000, preferably from about 1,000 to about 10,000, and are usually solids. Preferred cyclic polycarbonate oligomers of the above formulas VI and VII are those co-oligomers wherein each r is 0 and Z is $CH_2$ or adjacent Z moieties taken together are benzo. The oligomer of alternating moieties of carbonyl and 1,6-di(4-oxyphenyl)-1,6-diazaspiro[4.4]nonane-2,7-dione is particularly preferred or the corresponding teroligomer in which BPA is present in a ratio of about 3 moieties from BPA to one moiety from the spirodilactam.

The cyclic polycarbonate oligomers are intermediates to linear high molecular weight linear polycarbonate thermoplastic polymers such as those described in U.S. Pat. No. 4,906,725 and have the utilities normally associated with thermoplastic polymers, for example, the cyclic oligomer compositions of this invention are useful as intermediates for conversion to solvent-resistant linear polycarbonate polymers. Such conversion may be achieved by contacting the cyclic oligomer composition of the invention with a polycarbonate polymer formation catalyst at a temperature up to about 350° C.

The polycarbonate polymer formation catalyst which can be used in the polycarbonate polymer formation method include various bases and Lewis acids. Basic catalysts are exemplified by lithium phenate, lithium salts of hydroxy-terminated polycarbonates, lithium 2,2,2-trifluoroethoxide, n-butyllithium and tetramethylammonium hydroxide. Also useful are various weakly basic salts such as sodium benzoate, lithium stearate, sodium salts of unsubstituted and substituted phenylacetic acids and tetraarylborate salts. Other Lewis acids useful as polycarbonate formation catalysts include dioctyltin oxide; triethanolaminetitanium isopropoxide; tetra(2-ethylhexyl)titane; polyvalent metal chelates such as bisisopropoxytitanium bisacetylacetonate, the bisisopropoxyaluminum salt of ethyl acetoacetate and various transition metal acetylacetonates; and unsubstituted and substituted phenylacetic acids. Lithium stearate and bisisopropyltitanium bisacetylacetonate are preferred.

The reaction to prepare linear polycarbonate polymer is typically effected by simply contacting the cyclic oligomer composition with the catalyst at temperatures up to 350° C., preferably about 200°-300° C., until polymerization has proceeded to the extent desired. Although the use of a solvent is permissible, it is generally not preferred. In general, the amount of catalyst used is about 0.001-1.0 mole percent based on structural units (m+n) in the oligomer mixture. Molecular weight can be controlled by varying the amount of catalyst, with a decrease in said amount generally resulting in an increase in molecular weight, or by employing known chain transfer agents, of which diphenyl carbonate is an example, typically in amounts up to about 2.5 mole percent based on structural units in the oligomer mixture. Polymers of very high molecular weights can be prepared, particularly when no chain transfer agents are used.

The polymers are processed by the usual methods, such as extrusion or injection molding, into films, sheets and molded articles of demonstrated utility. In addition, however, because of the relatively high glass transition temperatures exhibited by the polycarbonate polymers prepared in the process of the invention, on occasion over 200° C. or even higher, they are also useful as engineering thermoplastics in applications likely to involve exposure to elevated temperature, e.g., containers for food and drink or base materials for electrical or electronic applications.

The invention is further illustrated by the following Illustrative Embodiments which should not be construed as limiting the invention.

ILLUSTRATIVE EMBODIMENT I

To a 4-necked twelve liter flask fitted with a thermometer, nitrogen inlet port, mechanical stirrer, 250 ml additional funnel and reflux condenser was added 40 g (1.0 mole) of sodium hydroxide, 300 ml of distilled water, 45.6 g (0.2 mole) of bisphenol A, 67.6 g (0.2 mole) of 1,6-di(4-hydroxyphenyl)-1,6-diazaspiro[4.4]nonane-2,7-dione and 500 ml of chloroform with continuous stirring under nitrogen at up to 25° C. To this solution was added over 30 minutes 147.1 g (0.4 mole) of bisphenol A dichloroformate dissolved in 960 ml of chloroform with ice cooling to keep the temperature at 25° C. The reaction mixture was stirred for five minutes after which 8 ml of triethylamine were added with ice cooling to keep the temperature at 25° C. The reaction mixture was warmed to room temperature and thereafter stirred overnight. At the end of the reaction, the reaction mixture was washed with hydrochloric acid and distilled water and then coagulated in methanol. A white polymer was precipitated and collected by filtration. The filtrate was stripped to afford 5.0 g of spirodilactam cyclic polycarbonate oligomer. The oligomer had a field desorption mass spectrometry analysis consistent with a cyclic oligomer having repeating units of di(4-oxyphenyl)propane and 1,6-diazaspiro[4.4]-nonane-2,7-dione separated by carbonyl units and corresponding to the AB-AB$_5$ adducts of the formula

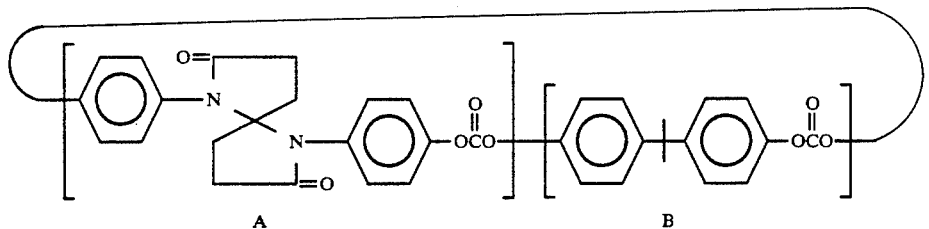

ILLUSTRATIVE EMBODIMENT II (DILUTE)

To a mixture of 1.0 mole of sodium hydroxide, 300 ml of distilled water, 0.2 mole of bisphenol A, 0.2 mole of 1,6-di(4-hydroxyphenyl)-1,6-diazaspiro[4.4]nonane-2,7-dione, in 500 ml of chloroform with continuous stirring under nitrogen at 25° C. To this mixture is added gradually over 30 minutes a mixture of 0.4 mole of bisphenol A dichloroformate and 8 ml of triethylamine dissolved in 960 ml of chloroform with ice cooling to keep the temperature at 25° C. At the end of the reaction, the reaction mixture is washed with hydrochloric acid and distilled water and then is coagulated in methanol. Any white polymer formed is precipitated and collected by filtration. The filtrate is stripped to give a spirodilactam cyclic polycarbonate oligomer having a structure consistent with cyclic oligomers having repeating units of di(4-oxyphenyl)propane and 1,6-diazaspiro[4.4]-nonane-2,7-dione separated by carbonyl units.

ILLUSTRATIVE EMBODIMENT III

A polycarbonate polymer containing carbonyl moieties separating moieties of a dioxyaryl-spirodilactam and a di(oxyphenyl) compound is prepared by heating a cyclic oligomer prepared similar to Embodiment I or II above with a catalytic amount of lithium stearate.

What is claimed is:

1. A cyclic polycarbonate oligomer having a first repeating segment of the formula VI

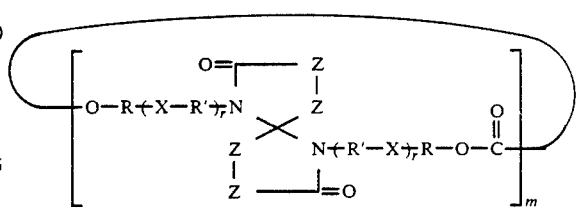

and with or without up to twice the molar quantity in the cyclic chain of the first segment of a second repeating segment of the formula VII

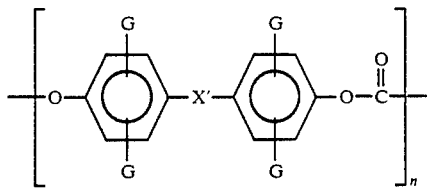

wherein m is from about 1 to about 20; n is from about 0 to about 19 and the sum of m+n equals from about 2 to about 20; R is aromatic of up to 15 carbon atoms and up to two aromatic rings, inclusive, R' is R or aliphatic of up to 10 carbon atoms, inclusive, r is 0 or 1, X is a direct valence bond or X is alkylene of up to 8 carbon atoms, inclusive, oxy, thio, sulfonyl, carbonyl, dioxyphenylene, 2,2-di(oxyphenyl)propane, di(oxyphenyl) sulfone or dioxydiphenylene, Z independently is $>C(Z')_2$ in which Z' independently is hydrogen, lower alkyl of up to 4 carbon atoms, fluoro, chloro, or phenyl, or Z is such that two adjacent Z groups taken together form a ring system Z" of 1 to 3 rings, each ring of from 5 to 7 ring atoms up to two of which are heteroatoms selected from nitrogen, oxygen or sulfur with the remainder of the ring atoms being carbon atoms, two of which form a bridge between the carbon atoms connected by the adjacent Z groups, X' is a direct valence bond, or X' is alkylene of up to 8 carbon atoms, inclusive, oxy, thio, sulfonyl or carbonyl, and G is hydrogen, lower alkyl, chloro or bromo, said cyclic oligomer having a degree of polymerization of from about 2 to 20.

2. The cyclic polycarbonate oligomer of claim 1 wherein the polymer is a co-oligomer.

3. The cyclic polycarbonate co-oligomer of claim 2 wherein R' is aromatic.

4. The cyclic polycarbonate co-oligomer of claim 3 wherein each r is 0.

5. The cyclic polycarbonate co-oligomer according to any one of claims 1, 2, 3, or 4 wherein each Z is >C(Z')$_2$.

6. The cyclic polycarbonate co-oligomer of claim 5 wherein Z' is hydrogen or methyl.

7. The cyclic polycarbonate co-oligomer of claim 6 wherein R is phenylene.

8. The cyclic polycarbonate co-oligomer of claim 7 wherein R is 4-phenylene.

9. The cyclic polycarbonate co-oligomer of claim 8 wherein Z' is hydrogen.

10. The cyclic polycarbonate co-oligomer according to any one of claims 1, 2, 3, or 4 wherein adjacent Z moieties are Z".

11. The cyclic polycarbonate co-oligomer of claim 10 wherein Z" is benzo.

12. The cyclic polycarbonate co-oligomer of claim 11 wherein R is phenylene.

13. The cyclic polycarbonate co-oligomer of claim 12 wherein R is 4-phenylene.

14. The cyclic polycarbonate oligomer of claim 1 wherein the polymer is a terpolymer.

15. The cyclic polycarbonate teroligomer of claim 14 wherein R' is aromatic.

16. The cyclic polycarbonate teroligomer of claim 15 wherein each r is 0.

17. The cyclic polycarbonate teroligomer of claim 16 wherein G is bromo.

18. The cyclic polycarbonate teroligomer of claim 16 wherein G is hydrogen.

19. The cyclic polycarbonate teroligomer of claim 18 wherein the molar quantity of the second segment is up to equal to the molar quantity of the first segment.

20. The cyclic polycarbonate teroligomer of claim 19 wherein each Z is >C(Z')$_2$.

21. The cyclic polycarbonate teroligomer of claim 20 wherein Z' is hydrogen or methyl.

22. The cyclic polycarbonate teroligomer of claim 21 wherein R is phenylene.

23. The cyclic polycarbonate teroligomer of claim 22 wherein R is 4-phenylene.

24. The cyclic polycarbonate teroligomer of claim 23 wherein Z' is hydrogen.

25. The cyclic polycarbonate teroligomer of claim 19 wherein adjacent Z groups are Z".

26. The cyclic polycarbonate teroligomer of claim 25 wherein R is phenylene.

27. The cyclic polycarbonate teroligomer of claim 26 wherein Z" is benzo.

28. The cyclic polycarbonate teroligomer of claim 27 wherein R is 4-phenylene.

29. A method of preparing a spirodilactam cyclic polycarbonate oligomer comprises reacting a mixture of at least one dihydroxyaryl-containing spirodilactam with or without a dihydroxyphenyl compound, or metal salts thereof; at least one carbonate source compound; at least one tertiary amine or quaternary ammonium salt; an aqueous alkali or alkaline earth metal hydroxide or carbonate solution; and an inert non-polar organic liquid; and removing any polymer by-product and unreacted starting materials to obtain a spirodilactam cyclic polycarbonate oligomer.

* * * * *